(12) United States Patent
Smith

(10) Patent No.: US 6,934,769 B2
(45) Date of Patent: Aug. 23, 2005

(54) METHODS AND STRUCTURE FOR SCSI/IDE TRANSLATION IN A STORAGE SUBSYSTEM

(75) Inventor: Gerald Edward Smith, Suwanee, GA (US)

(73) Assignee: LSI Logic Corporation, Milpitas, CA (US)

( * ) Notice: Subject to any disclaimer, the term of this patent is extended or adjusted under 35 U.S.C. 154(b) by 34 days.

(21) Appl. No.: 10/207,672

(22) Filed: Jul. 29, 2002

(65) Prior Publication Data

US 2004/0019706 A1 Jan. 29, 2004

(51) Int. Cl.⁷ .................................................. G06F 3/00
(52) U.S. Cl. .......................... 710/5; 710/11; 710/32; 711/114
(58) Field of Search .......................... 710/5, 11, 32, 710/8; 711/114

(56) References Cited

U.S. PATENT DOCUMENTS

| | | | |
|---|---|---|---|
| 5,809,285 A | | 9/1998 | Hilland |
| 5,922,062 A | * | 7/1999 | Evoy ........................... 710/305 |
| 6,006,295 A | * | 12/1999 | Jones et al. .................... 710/62 |
| 6,073,201 A | | 6/2000 | Jolley et al. |
| 6,154,810 A | * | 11/2000 | Derby et al. ................. 711/113 |
| 6,209,023 B1 | * | 3/2001 | Dimitroff et al. ........... 709/211 |
| 6,338,139 B1 | * | 1/2002 | Ando et al. ................. 713/168 |
| 6,553,433 B1 | * | 4/2003 | Chang .......................... 710/15 |
| 6,553,440 B1 | * | 4/2003 | Ikegaya ........................ 710/62 |
| 2001/0003197 A1 | * | 6/2001 | Matsushima et al. ......... 710/64 |
| 2002/0062387 A1 | * | 5/2002 | Yatziv ......................... 709/236 |
| 2002/0078276 A1 | * | 6/2002 | Hung .......................... 710/74 |
| 2002/0083221 A1 | * | 6/2002 | Tsai et al. ..................... 710/1 |

FOREIGN PATENT DOCUMENTS

| | | | |
|---|---|---|---|
| EP | 1024433 A1 | * 8/2000 | ........... G06F/13/40 |
| JP | 11345195 A | 12/1999 | |
| JP | 2001100990 A | 4/2001 | |
| JP | 2001100990 | * 4/2001 | ............. G06F/9/06 |
| JP | 2001306327 A | 11/2001 | |

OTHER PUBLICATIONS

IP SANS, Tom Clark, Nov. 2001, section s4.2 The SCSI Architectural Model.*
SCSI commands and status—http://www.danbbs.dk/~dino/SCSI/SCSI2–01.html, Apr. 12, 2001.*
Newton, Harry; Newton's Telecom Dictionary; 2002; CMP Books; 18th edition.*
www.dictionary.com-->keyword: conversion.*
ARS–2000IW User's Manual, ACARD Technology Corp. Ver: 1.0, Copyright 2000.
Arena 99EX SCSI to IDE Disk Array System, User's Guide, Version 5.11, May 2000.

* cited by examiner

*Primary Examiner*—Jeffrey Gaffin
*Assistant Examiner*—Alan S Chen
(74) *Attorney, Agent, or Firm*—Duft Bornsen & Fishman, LLP

(57) ABSTRACT

Methods and associated structure operable within a SCSI-based storage subsystem to adapt the storage controller for use with non-SCSI disk drives. A firmware layer of the present invention intercepts SCSI read/write requests and pass through command blocks (CDBs) generated by the storage management core of the controller and translates the requests and command structures into corresponding command structures for transmission to a non-SCSI disk drive. In like manner, the firmware layer of the present invention receives status information from non-SCSI disk drives and translates the status information into corresponding SCSI compatible status information. In one exemplary preferred embodiment, a storage subsystem designed for interaction with SCSI disk drives may be adapted in accordance with the present invention to utilize lower-cost, commodity disk drives such as IDE compatible disk drives.

12 Claims, 3 Drawing Sheets

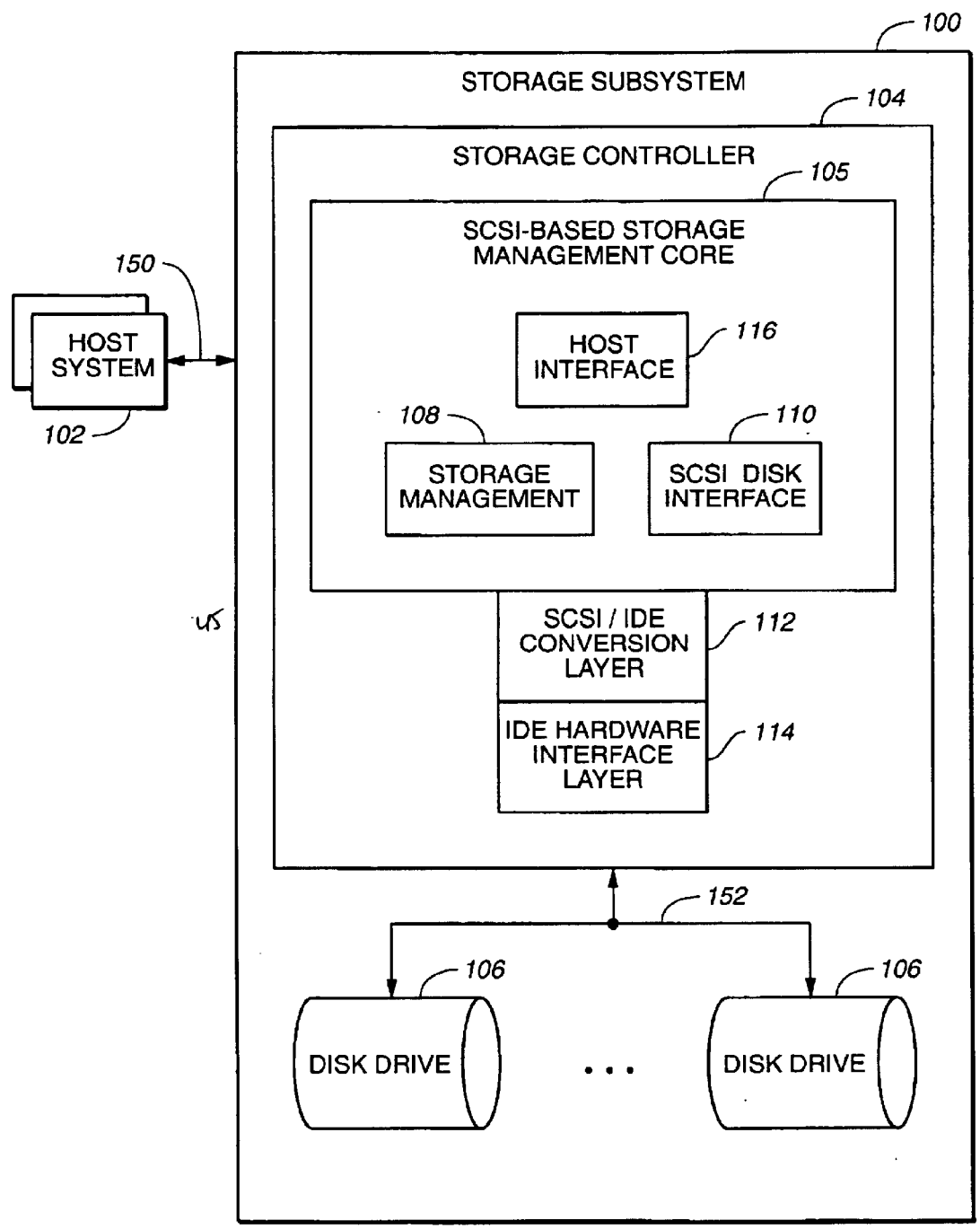
FIG._1

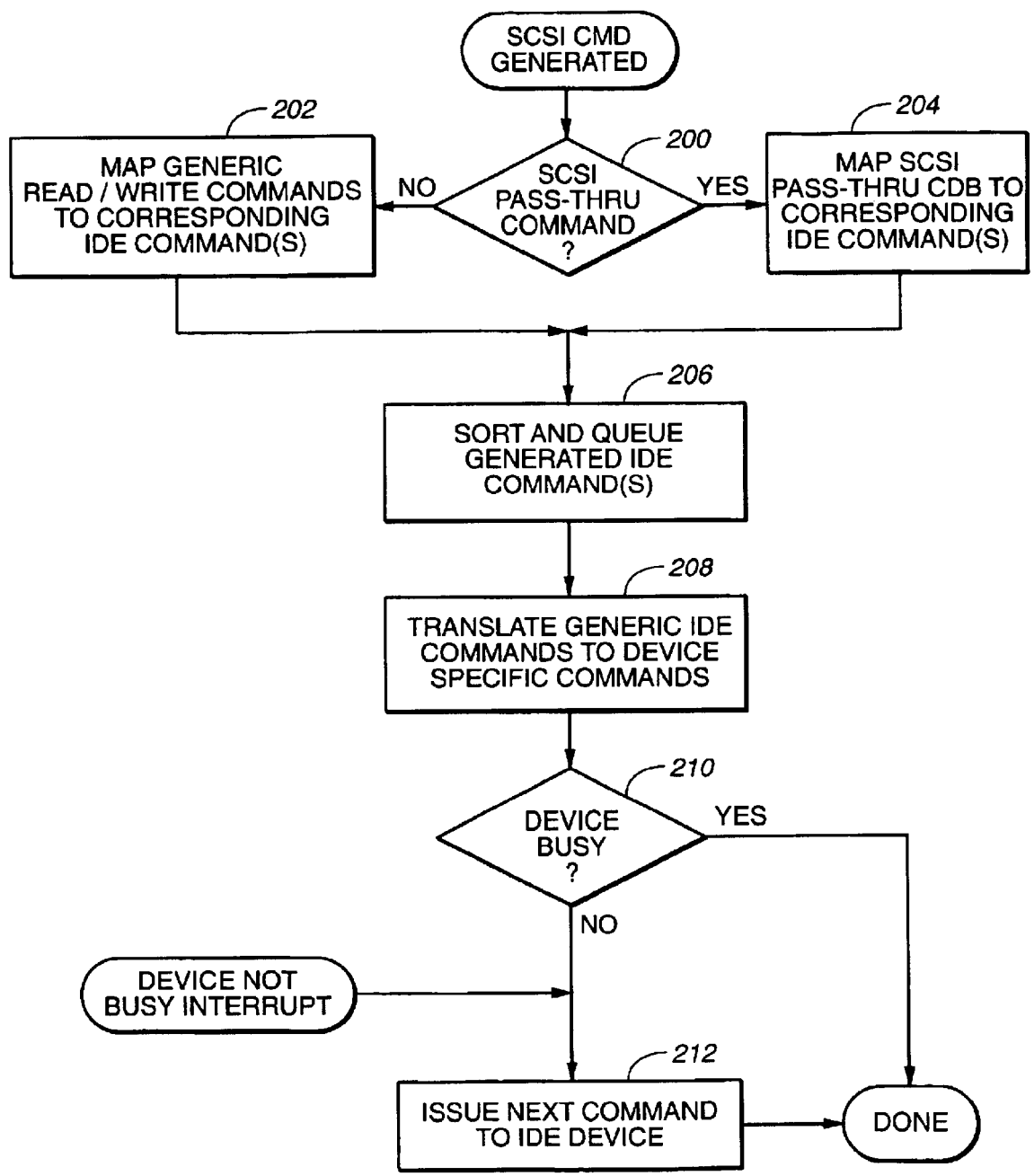
FIG._2

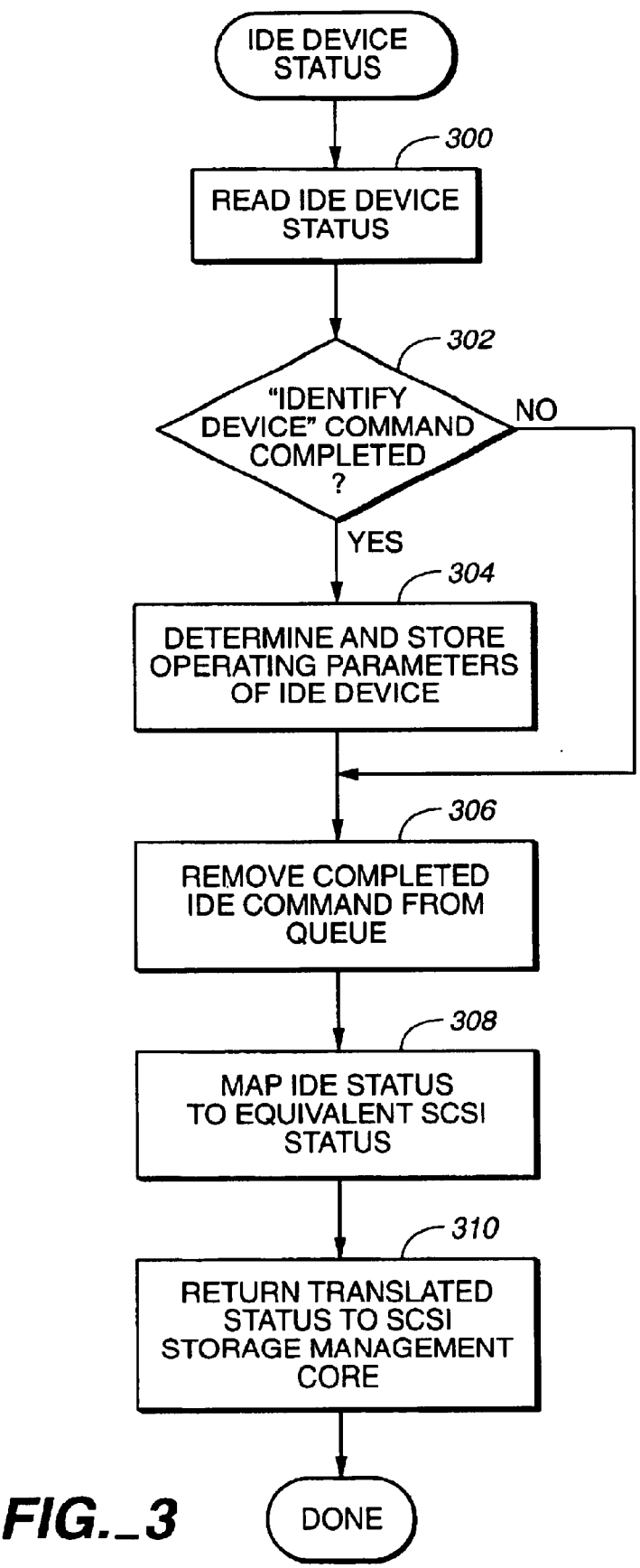
FIG._3

METHODS AND STRUCTURE FOR SCSI/IDE TRANSLATION IN A STORAGE SUBSYSTEM

BACKGROUND OF THE INVENTION

1. Field on the Invention

The invention relates to storage subsystem control methods and structures and more specifically relates to methods and structures for utilizing non-SCSI disk drives in a storage subsystem designed for SCSI interfacing.

2. Discussion of Related Art

High-capacity, high-performance storage subsystems often utilize a plurality of disk drives to achieve redundancy for enhanced reliability and to achieve performance improvements. Reliability is enhanced by creating redundancy information to be stored in the storage subsystem in addition to the user or host supplied data. Further, the user data and redundancy information may be distributed over multiple disk drives so that failure of any single disk drive will not cause loss of data or prevent continued utilization of the storage subsystem. In addition, performance of a storage subsystem may be enhanced by distributing stored data (user and/or redundancy data) over multiple disk drives so that I/O requests may be processed by multiple disk drives in parallel rather than waiting for operations to complete on a single disk drive.

Often, such storage subsystems utilizing multiple disk drives are designed to utilize SCSI interface disk drives. The SCSI interface (small computer system interface) disk drives often provide higher performance as compared to lower-cost, commodity disk drives. High-performance subsystems therefore often utilize such higher performance SCSI disk drives. The SCSI standard is well documented and readily available in printed or electronic form from numerous source. Numerous older and updated versions may be readily located in the worldwide web on the Internet by those of ordinary skill in the art. As used here, "SCSI" refers to any and all present, future and past versions of the SCSI specifications. The problems addressed herein and the solutions provided by the present invention are applicable to systems using disk drives compliant with any and all versions of the SCSI standard specifications.

One common type of storage subsystem is referred to as a RAID storage subsystem (redundant array of independent drives). Such a RAID storage subsystem typically includes one or more storage controllers to provide processing functionality for receiving and processing host system supplied I/O requests and for managing lower-level manipulation of information stored on and retrieved from a plurality of disk drives associated with the subsystem. The storage controller performs required management and processing to effectuate the RAID storage management techniques. In particular, a RAID storage controller manages generation, storage and retrieval of redundancy information and associated host supplied data and also manages the distribution (striping) of data over the multiple disk drives.

In view of the traditional preference for high performance SCSI disk drives, many RAID storage controllers are designed and programmed in a manner optimized for utilization of such high-performance SCSI disk drives. The SCSI interface standards describe command structures and associated data structures useful in interacting with SCSI disk drives and other SCSI devices. SCSI oriented RAID storage controllers therefore are designed to expect and utilize such structures and command interfaces. The control processes (i.e., firmware) operable within typical RAID) controllers designed for SCSI disk drives therefore are typically designed assuming use of standard SCSI commands and status as well as standard data structures used for interacting with such SCSI disk drives (such command data structures are often referred to as command descriptor blocks or simply as CDBs).

Non-SCSI disk drives such as IDE interface disk drives have advanced substantially in performance and remain substantially less expensive than higher performance SCSI disk drives. However, an existing storage controller architecture originally designed for interacting with SCSI disk drives is not easily adapted for utilization of lower-cost non-SCSI disk drives. Adapting an existing SCSI-based storage controller design to utilize non-SCSI lower cost disk drives can require substantial re-work and re-design of the controller. Significant cost, complexity and potential for error may be involved in such a conversion. It is therefore a problem to easily adapt existing storage controller designs intended for SCSI disk drive utilization to enable utilization of lower-cost non-SCSI disk drives.

It is evident from the above discussion that a need exists for methods and associated structure to simplify adaptation of a storage controller for utilization of a variety of disk drives.

SUMMARY OF THE INVENTION

The present invention solves the above and other problems, thereby advancing the state of useful arts, by providing methods and associated structure for easily converting between SCSI command/status interfaces and non-SCSI command/status interfaces to enable direct operation of non-SCSI disk drives in a storage controller designed for SCSI disk drive interfacing. SCSI commands are converted to corresponding sequences of non-SCSI commands and non-SCSI status information is converted to equivalent SCSI status information to enable return of information from non-SCSI disk drives. More specifically, the present invention provides a firmware layer that intercepts SCSI command blocks directed toward disk drives and converts the intercepted command structures and directives into appropriate command directives and structures for desired non-SCSI disk drives. In like manner, the firmware layer of the present invention intercepts returned status information from non-SCSI disk drives and converts the non-SCSI status information into corresponding SCSI compatible status information for return to higher layers of the SCSI-based storage controller.

Still more specifically, in one exemplary preferred embodiment, SCSI command blocks are intercepted and converted to corresponding IDE command structures. Further, IDE status information may be received by a firmware layer of the present invention and converted to corresponding SCSI status information for return to higher layers of the storage controller.

A first feature of the invention therefore provides a storage subsystem comprising: a storage controller adapted for controlling SCSI storage devices; a non-SCSI storage device; and a conversion element coupling the storage controller to the storage device for converting information exchanged between the storage controller and the non-SCSI storage device.

Another aspect of the invention further provides that the conversion element includes: a pass-through SCSI CDB conversion element to convert pass-through SCSI commands for application to the non-SCSI storage device.

Another aspect of the invention further provides that the conversion element includes: a read/write SCSI message conversion element to convert read and write SCSI requests for application to the non-SCSI storage device.

Another aspect of the invention further provides that the conversion element includes: a status conversion element for receiving status information from the non-SCSI storage device and converting the status information to related SCSI status information.

Another aspect of the invention further provides that the non-SCSI storage device is an IDE compliant storage device.

Another aspect of the invention further provides that the storage controller is a RAID storage controller.

Another feature of the invention provides a storage controller comprising: a SCSI-based RAID storage control core element; an IDE interface for coupling the storage controller to a plurality of IDE disk drives; a SCSI/IDE command conversion element for converting commands generated by the SCSI-based RAID storage controller core element for application to an IDE disk drive coupled to the IDE interface; and an IDE/SCSI status conversion element for converting status information received from an IDE disk drive coupled to the IDE interface for application to the SCSI-based RAID storage control core element.

Another feature of the system provides a system comprising: a plurality of non-SCSI storage devices; and a SCSI-based storage controller communicatively coupled to the plurality of non-SCSI storage devices such that the SCSI-based controller includes: storage management core means for managing storage of data on the plurality of non-SCSI storage devices; and SCSI command conversion means for converting SCSI commands generated by the storage management core means for application to the plurality of non-SCSI storage devices.

Another aspect of the invention further provides that the plurality of non-SCSI storage devices comprises a plurality of IDE disk drives such that the SCSI command conversion means comprises: command mapping means for mapping each SCSI command to a corresponding sequence of one or more IDE commands.

Another aspect of the invention further provides that the controller further comprises: SCSI status conversion means for receiving status information from the plurality of non-SCSI storage devices and for converting the status information to equivalent SCSI status information and for applying the equivalent SCSI status to the storage management core means.

Another aspect of the invention further provides that the plurality of non-SCSI storage devices comprises a plurality of IDE disk drives such that the SCSI status conversion means comprises: means for receiving IDE status information from the plurality of IDE disk drives; and status mapping means for mapping the IDE status information to a corresponding sequence of one or more SCSI status messages.

Another feature of the invention provides for a method operable within a storage controller comprising the steps of: generating SCSI commands to manipulate data stored on disk drives associated with the storage controller; converting the SCSI commands to non-SCSI commands; and applying the non-SCSI commands to non-SCSI disk drives coupled to the storage controller.

Another aspect of the invention further provides the step of: providing a mapping table such that entries of the table maps a corresponding SCSI command to a conversion function for generating the non-SCSI commands, such that the step of converting the SCSI commands comprises: looking up the SCSI command in the mapping table to identify the corresponding conversion function; and invoking the corresponding conversion function to generate the non-SCSI commands.

Another aspect of the invention further provides the steps of: receiving non-SCSI status information from the non-SCSI disk drives; converting the non-SCSI status information to SCSI status information; and applying the SCSI status information to storage management elements operable within the storage controller.

BRIEF DESCRIPTION OF THE DRAWINGS

FIG. 1 is a block diagram of a system including a SCSI-based storage controller adapted to convert between SCSI and non-SCSI command and status interfacing.

FIG. 2 is a flowchart describing a method of the present invention for converting SCSI commands to non-SCSI commands for application to a non-SCSI storage device.

FIG. 3 is a flowchart describing a method of the present invention for converting status information from non-SCSI storage devices into SCSI compliant equivalent status information.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a storage subsystem 100 adapted in accordance with the present intention to convert SCSI command and status information exchange for interfacing with non-SCSI disk drives 106. SCSI-based storage controller 104 may be designed for SCSI interfacing with storage devices. The features of the present invention allow for such an existing SCSI-based design to be easily adapted for use with non-SCSI storage devices.

SCSI-based storage management core 105 may preferably include a host interface element 116 for managing interaction with host systems 102 via path 150. Path 150 may be any of several well known communication media used for coupling a host system to a storage subsystem including for example parallel SCSI, local area networks, Fibre Channel, etc. Host interface element 116 may preferably receive I/O requests from a host system 102 coupled to storage subsystem 100 via path 150 and forwards any required response or status information back to the requesting host system 102.

SCSI-based storage management core 105 may also preferably include a storage management element 108 generally responsible for higher level storage management functions within storage controller 104 of storage subsystem 100. For example, storage management element 108 may provide desired processing for RAID storage management techniques applied within storage controller 104. Such RAID storage management techniques may include, as known in the art, redundancy information generation and checking as well as distribution or striping of data and redundancy information over a plurality of disk drives. Those of ordinary skill in the art will readily recognize that RAID storage management is merely exemplary of one form of storage management common within high-performance, high reliability storage subsystems. Other storage management techniques may be applied within SCSI-based storage management core 105 within the spirit and scope of the present invention.

SCSI-based storage management core 105 also may preferably include SCSI disk interface element 110 for providing lower level control and access to SCSI compliant storage devices such as disk drives.

Storage controller 104 and SCSI-based storage management core 105 therefore represent a typical SCSI-based storage controller architecture as presently known and practiced in the art. Storage controller 104 is however adapted in accordance with the present invention to permit translation and conversion of information exchanged between the storage controller 104 and disk drives 106. In particular, SCSI/IDE conversion layer 112 adapts commands and status normally exchanged between SCSI disk interface 110 and appropriately configured SCSI storage devices to permit utilization of lower-cost, commodity disk drives 106. Exemplary of such lower-cost commodity disk drives are IDE drives and related variants of IDE interface techniques.

SCSI commands may be generated by elements within SCSI-based storage management core 105 and are communicated to SCSI/IDE conversion layer 112. Following conversion from SCSI non-SCSI command sequence structures, the generated, converted command structures are then applied in accordance with known techniques to the non-SCSI disk drives 106 via non-SCSI (i.e., IDE) hardware interface layer 114. In like manner, status information returned from disk drives 106 is converted within conversion layer 112 back into a form and semantic consistent with SCSI specifications. In one exemplary preferred embodiment conversion layer 112 provides conversion between SCSI and non-SCSI command and status exchanges in a manner transparent to SCSI-based storage management core 105. In this manner, the present invention simplifies the process of converting an existing SCSI-based storage management architecture to permit utilization of lower-cost non-SCSI storage devices. SCSI-based storage management core 105 may be left substantially unchanged where conversion layer 112 transparently provides requisite conversion between syntax, structure and semantic interpretation of various command and status information exchanges.

In one exemplary preferred embodiment, disk drives 106 are IDE compliant disk drives as well-known in the industry. Path 152 therefore may represent an IDE interface signal path. IDE hardware interface layer 114 exchanges IDE compliant signals over past 152 to forward IDE commands supplied by conversion layer 112 to disk drives 106 and to retrieve IDE status from disk drives 106. In this exemplary preferred embodiment, SCSI-based storage management core 105 is adapted by use of conversion layer 112 to permit utilization of lower-cost, commodity IDE disk drives in an otherwise SCSI-based storage subsystem architecture.

FIG. 2 is a flowchart describing a method of the present invention whereby SCSI command structures generated by a SCSI-based storage management core structure within the storage controller are intercepted by the conversion process and converted into non-SCSI (i.e., IDE) command structures. Upon receipt of a generated SCSI command, element 200 is first operable to determine whether the received SCSI command structure represents a typical, generic read/write operation or whether the received SCSI command structure represents a SCSI pass-through command structure. In general, most storage subsystems utilize generic SCSI read and write commands to perform desired transfer of data between the storage controller and a plurality of disk drives coupled thereto. Numerous other SCSI commands may be utilized to provide special-purpose data transfers or other status and control functions in exchanges between the disk drives and the storage controller. Often these other commands are referred to as "pass-through" SCSI commands in that lower level specific sequences of SCSI commands may be constructed by the storage controller to effectuate a particular control or status information exchange. By contrast, typical, generic read/write operations may be specified as higher level SCSI command structures.

If element 200 determines that the intercepted SCSI command represents a SCSI pass-through command structure, element 204 is operable to map the specified SCSI pass-through command to corresponding sequences of one or more IDE (non-SCSI) command sequences. Processing then continues at element 206. If element 200 determines that the received SCSI command represents a generic read/write operation, element 202 is instead operable to map is the intercepted generic read/write request into corresponding sequences of one or more IDE (non-SCSI) command sequences. Processing then continues with element 206 below.

The mapping process performed by elements 202 and 204 may be implemented using any of numerous equivalent programmable software or hardware constructs in accordance with the present invention. For example, a table structure may be utilized indexed by a particular SCSI command value to access a data structure containing corresponding IDE commands. Or, for example, the entry in such a table may contain a pointer to a function used to generate corresponding sequences of IDE commands to perform the corresponding SCSI command. Those of ordinary skill in the art will recognize a variety of equivalent structures and techniques for mapping from a received SCSI command directive to corresponding sequences of one or more non-SCSI (IDE) command sequences.

Those of ordinary skill in the art will recognize that all SCSI operations may be specified in any format such that elements 200–204 need not select among different command structures (i.e., generic read/write operations as distinct from pass-through structures). Or, additional specific formats may be specified for certain implementation features. More broadly, in accordance with the present invention, any received SCSI request may be converted to non-SCSI equivalent operations in accordance with any selected SCSI command/messaging format. Such design choices are well known to those of ordinary skill in the art and are within the scope of the present invention.

Element 206 is then operable to sort and queue IDE commands generated by operation of either of elements 202 and 204 described above. In an exemplary preferred embodiment, the conversion layer of the present invention maintains a queue of commands to be applied to each of a plurality of non-SCSI storage devices associated with the storage subsystem. Commands generated to be applied to a particular non-SCSI storage device are added to the corresponding queue for that storage device. Further, processing of element 206 may analyze the queue of commands and combine sequences of consecutive smaller read or write commands into a single larger I/O request to the corresponding non-SCSI device. Such aggregation of smaller command operations provides further performance enhancement in operation of the non-SCSI storage devices.

Element 208 is next operable to translate the generic IDE commands queued for a device into specific IDE commands that may be issued for the specific device based on features and configuration parameters of the specific device. For example, where the storage devices are IDE compliant storage devices, read and write commands may be mapped to corresponding UDMA and MDMA or PIO read/write command structures according to the supported modes of the specific non-SCSI (IDE) device.

Element 210 determines if the specified non-SCSI device is presently busy processing a command previously applied to the device. If not, processing continues with element 212 to apply the next command presently queued for the device to the appropriate, specified non-SCSI (IDE) device thereby completing processing of the method of FIG. 2. If element 210 determines that the specified non-SCSI device is presently busy processing another non-SCSI command sequences, the method completes and the newly queued commands remain queued for later processing as discussed further hearing below. In general, an interrupt or other status detected from the specific non-SCSI disk drive will generate appropriate status information to be directed back to be storage management core structure and will also trigger a determination that the next queued command may be initiated and applied to the device.

FIG. 3 is a flowchart of a process of the present invention wherein a non-SCSI (IDE) device interrupts the system to report completion status for a previously applied non-SCSI command. Often such status is reported using interrupt features of the non-SCSI interface bus. For example, an IDE disk drive utilizes the IDE interface to provide an interrupt indicating that the previously applied command has been completed. Upon receipt of such a status message or interrupt, element 300 is first operable to read any required device status information from the interrupting device representing completion status of a previously applied command.

During initialization of a storage subsystem (SCSI or non-SCSI) most controllers utilize the storage devices in the simplest modes available. Numerous options and features are often present in the storage devices but these features are unknown to the storage controller until after initialization of the storage devices. In SCSI-based systems, the controller usually issues a SCSI "Inquiry" command to request information about each disk drive. Upon return of corresponding information, the subsystem may utilize various performance features available on the individual disk drives.

In accordance with the present invention, a SCSI Inquiry command may be translated to an IDE "Identify Device" to request information about the IDE disk drives (i.e., modes supported by the device and features supported). The information returned by the Identify Device IDE command may be analyzed by the conversion layer of the present invention to identify useful features and parameters for operating the corresponding disk drive.

Element 302 therefore determines if the completed command that corresponds to the received completion status is an "Identify Device" IDE command. If so, element 304 is operable to decode relevant parameters from the returned device information and store various parameters for later utilization as noted above. In either case, element 306 is next operable to remove the just completed non-SCSI command from the queue maintained for the corresponding non-SCSI (IDE) device. As noted above, element 306 may also include processing to initiate a next queued command retrieved from the queue corresponding to the specific interrupting device.

Element 308 is next operable to map the decoded IDE status to equivalent SCSI compliant status information. As above with regard to FIG. 2, the step of mapping may be implemented in numerous equivalent manners readily recognized by those of ordinary skill in the art. In one exemplary preferred embodiment, a table structure may be used to map received IDE (non-SCSI) status information into corresponding SCSI status data. Further, as noted above, an alternative embodiment may provide for a mapping table that maps the received IDE status into a corresponding pointer to a function invoked to generate corresponding SCSI status information. Element 310 is then operable to return back to the SCSI storage management elements of the storage controller the SCSI status information derived from the received non-SCSI (IDE) status information.

Those of ordinary skill in the art will readily recognize that the methods described in FIGS. 2 and 3 are exemplary of numerous equivalent techniques well-known to those of ordinary skill in the art for translating one form of command and status information to another. The methods of FIGS. 2 and 3 are therefore intended broadly to represent all such methods for translating between SCSI and non-SCSI formats for command and status information exchange between a SCSI-based storage controller and non-SCSI storage devices coupled thereto.

In addition, those of ordinary skill in the art will readily recognize that a storage controller as used herein may be implemented as a stand-alone device within a self-contained storage subsystem whereby host systems couple through the storage controller to the storage subsystem via any of several well-known peripheral interface connections. In addition, a storage controller adapted in accordance with the present invention may also be implemented as programmed instructions within a host system such as a workstation or personal computer. The present invention is intended to broadly cover all such implementations of storage controller's wherein a SCSI-based storage controller design may be quickly, easily, and inexpensively adapted for utilization of lower-cost non-SCSI storage devices such as IDE disk drives.

The following code sequences represent exemplary data structures that may be utilized in an exemplary embodiment of the present invention. The first data structure represents information relevant to the IDE interface on which SCSI information is to be applied after conversion to non-SCSI (IDE) formats. A second data structure represents information for each particular IDE device coupled to an IDE interface. Those of ordinary skill in the art will recognize the data structures below as exemplary of typical structures that may be utilized to represent such an IDE interface and device. Numerous equivalent structures will be readily apparent to those of ordinary skill in the art.

```
/*
 * define the IDE interface structure
 *
 * All interface-related data goes into this structure
 */
```

-continued

```
typedef struct    _IdeInterface   IdeInterface;
struct    _IdeInterface   {
    uint      taskFileBase;           /* IO base port address */
    uint      auxiliaryBase;          /* for auxiliary control
registers */
    uint      dmaBase;                /* DMA base address */
    uint      ctrlBase;               /* memory mapped base
                                         address of various
                                            internal registers of
                                            silicon image chip */
    uchar     number;                 /* interface number (0-n) */
    uchar     pciBus;                 /* PCI bus number where this
chip resides */
    uchar     pciDevice;              /* PCI device number */
    uchar     pciFunction;            /* PCI function number */
    uint      chipId;                 /* vendor id and decvice id
of the chip that this interface belongs to */
    uchar     resetComplete;          /* this field is TRUE after a
reset has successfully completed */
    uchar     saftePresent;           /* TRUE if SAF-TE devices
found on this interface */
    uchar     pad1[2];                /* reserved for future use */
    /*
     * these fields are refer to the "current" commands
     *
     * The 'callback' array also indicates which device(s) have
commands pending.    If the
     * callback pointer is NULL, then this device has no commands
pending.    Conversely,
     * if the pointer is non-NULL, then a command is either active or
pending (determined
     * by the value in 'activeDevice').
     */
    uchar     activeDevice;           /* index of "active" device
(0=idle, 1=device 0, 2=device 1) */
    uchar     deviceBlocked;          /* index of "blocked" device
(0=no devices, 1=device 0, 2=device 1) */
    uchar     ledActive;              /* TRUE if this channel's LED
is on */
    uchar     pad2 [1];               /* reserved for future use */
    IdeDeviceCallback    callback[IDE_MAX_DEVICES_PER_
                         INTERFACE];
/* call back pointers */
    /*
     * these fields hold information of the command in progress
relative to S/G list processing
     */
    uint      remainingSectorCount;   /* number of sectors
remaining to be transferred */
    struct    _IdeCmd *currentCmd;    /* pointer to current command
for S/G list processing */
    uint      currentSgIndex;         /* index of "current" S/G
element */
    uint      currentSgOffset;        /* current byte offset within
current S/G element */
    uint      timeoutStart;           /* ticker value when command
started (used for timeout) */
    /*
     * the acutal device structure reside here
     */
    IdeDevice   devices[IDE_MAX_DEVICES_PER_INTERFACE];   /* the
actual device structures */
};
/*
 * define the IDE device structure
 */
typedef struct    _IdeDevice    IdeDevice;
typedef void      (*IdeDeviceCallback)(IdeDevice *id, uint
interfaceStatus, IdeRegFileOut regEile);         /* callback function
pointer */
struct    _IdeDevice {
    struct    _IdeInterface    *intf;       /* interface on which
this device is located */
    uchar              device;              /* device index (0/1) for
this device on this interface */
    uchar              lDrive;              /* this device ldrive
number for RAID core */
    uchar              present;             /* TRUE when device is
```

-continued

```
present */
    uchar       supportsDma;        /* TRUE if DMA commands
are supported */
    uchar       supportsUltraDma;   /* TRUE if ultra DMA is
supported */
    uchar       supportsMultiple;   /* contains MULTIPLE
sector count (if supported) */
    uchar       supports48BitLba;   /* TRUE if 48-bit LBA
supported */
    uchar       isSpinning;         /* TRUE if device is
spinning */
    uchar       smartEnabled;       /* TRUE if SMART support
is currently enabled */
    uchar       writeCacheEnabled;  /* TRUE when write cache
is enabled */
    uchar       pad3[1];
    uchar       lastCmdTimedOut;    /* TRUE when the last
command issued failed with a timeout */
    uint                  totalUserSectors; /* Total user
addressable sectors */
    /*
     * these fields are used by the DCDB function to emulate a SCSI
device
     */
    SCSI_INQUIRY   inqData;         /* simulated inquiry data for
this device */
    struct   {
        uchar   unitAttnPending;    /* TRUE when unit attention
is pending */
        uchar   pad1;               /* pad byte for alignment */
        struct  {                   /* pending sense data */
            uchar   sense;
            uchar   asense;
            uchar   ascq;
            uchar   sksv;
            ushort  fieldPtr;
        } sense;
    }scsi;
};
```

The following code segment represents a typical table structure that may be used to effectuate mapping of SCSI command structures into corresponding sequences of equivalent IDE commands. The table structure includes an entry for each SCSI command code defined by SCSI specifications. Each entry constitutes a pointer to a function that may be invoked to generate equivalent IDE commands corresponding to the particular SCSI command. Those of ordinary skill in the art will recognize a variety of equivalent tables and structures that may be used to effectuate the mapping from a SCSI command to equivalent IDE sequences of commands. Similarly, those of ordinary skill in the art will recognize that a similar structure may be used for mapping of IDE or other status information into corresponding SCSI compliant status information. Numerous equivalent structures will be readily apparent to those of ordinary skill in the art.

```
/*
 * define function pointer array for SCSI CDBs
 */
static  t_cdbFunc   cdbFunc[ ] = {
    testUnitReady,  rezeroUnit,   invalidCdb,   requestSense,
/* 00–03 */
    formatUnit,     invalidCdb,   invalidCdb,   invalidCdb,
/* 04–07 */
    readWrite6,     invalidCdb,   readWrite6,   seek6,
/* 08–0B */
    invalidCdb,     invalidCdb,   invalidCdb,   invalidCdb,
/* 0C–0F */
    invalidCdb,     invalidCdb,   inquiry,      invalidCdb,
/* 10–13 */
    invalidCdb,     modeSelect6,  reserve6,     release6,
/* 14–17 */
    invalidCdb,     invalidCdb,   modeSense6,
startStopUnit  /* 18–1B */
    invalidCdb,     sendDiag,     preventAllowMediumRemoval,
invalidCdb,    /* 1C–1F */
    invalidCdb,     invalidCdb,   invalidCdb,   invalidCdb,
/* 20–23 */
    invalidCdb,     readCapacity, invalidCdb,   invalidCdb,
/* 24–27 */
    readWrite10,    invalidCdb,   readWrite10,  seek10,
/* 28–2B */
    invalidCdb,     invalidCdb,   readWrite10,  invalidCdb,
/* 2C–2F */
    invalidCdb,     invalidCdb,   invalidCdb,   invalidCdb,
/* 30–33 */
    invalidCdb,     syncCache,    invalidCdb,   invalidCdb,
/* 34–37 */
    invalidCdb,     invalidCdb,   invalidCdb,   writeBuffer,
/* 38–3B */
    readBuffer,     invalidCdb,   invalidCdb,   invalidCdb,
/* 3C–3F */
    invalidCdb,     invalidCdb,   invalidCdb,   invalidCdb,
/* 40–43 */
    invalidCdb,     invalidCdb,   invalidCdb,   invalidCdb,
/* 44–47 */
    invalidCdb,     invalidCdb,   invalidCdb,   invalidCdb,
/* 48–4B */
    invalidCdb,     logSense,     invalidCdb,   invalidCdb,
```

-continued

```
/* 4C-4F */
    invalidCdb,    invalidCdb,    invalidCdb,    invalidCdb,
/* 50-53 */
    invalidCdb,    modeSelect10,  reserve10,     release10,
/* 54-57 */
    invalidCdb,    invalidCdb,    modeSense10,   invalidCdb
/* 58-5B */
};
/*
 * define SCSI CDB function prototypes
 */
static void   formatUnit(IdeCmd *ic);
static void   formatUnitCallback(IdeCmd *ic, uint status);
static void   inquiry(IdeCmd *ic);
static void   inquiryCallback(IdeCmd *ic, uint status);
static void   invalidCdb(IdeCmd *ic);
static void   logSense(IdeCmd *ic);
static void   logSenseCallback(IdeCmd *ic, uint status);
static void   modeSelect10(IdeCmd *ic);
static void   modeSelect6(IdeCmd *ic);
static void   modeSense10(IdeCmd *ic);
static void   modeSense6(IdeCmd *ic);
static void   preventAllowMediumRemoval(IdeCmd *ic);
static void   readBuffer(IdeCmd *ic);
static void   readBufferCallback(IdeCmd *ic, uint status);
static void   readCapacity(IdeCmd *ic);
static void   readWrite10(IdeCmd *ic);
static void   readWrite6(IdeCmd *ic);
static void   readWriteCommon(IdeCmd *ic);
static void   readWriteCallback(IdeCmd *ic, uint status);
static void   release10(IdeCmd *ic);
static void   release6(IdeCmd *ic);
static void   requestSense(IdeCmd *ic);
static void   selfTestProgressCallback(IdeCmd *ic, uint status);
static void   reserve10(IdeCmd *ic);
static void   reserve6(IdeCmd *ic);
static void   rezeroUnit(IdeCmd *ic);
static void   seek10(IdeCmd *ic);
static void   seek6(IdeCmd *ic);
static void   seekCallback(IdeCmd *ic, uint status);
static void   sendDiag(IdeCmd *ic);
static void   sendDiagCallback(IdeCmd *ic, uint status);
static void   sendDiagSmartCallback(IdeCmd *ic, uint status);
static void   startStopUnit(IdeCmd *ic);
static void   startStopunitCallback(IdeCmd *ic, uint status);
static void   syncCache(IdeCmd *ic);
static void   syncCacheCallback(IdeCmd *ic, uint status);
static void   testUnitReady(IdeCmd *ic);
static void   testUnitReadyCallback(IdeCmd *ic, uint status);
static void   testUnitReadyIdentifyCallback(IdeCmd *ic, uint status);
static void   writeBuffer(IdeCmd *ic);
static void   writeBufferCallback(IdeCmd *ic, uint status);
```

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A storage subsystem comprising:
a storage controller adapted for controlling SCSI storage devices using SCSI command and status information exchanges and adapted for coupling to a host system for receiving host I/O requests wherein said command and status information exchanges include one or more SCSI command descriptor blocks generated by said storage controller;
a non-SCSI storage device adapted to process non-SCSI command and status information exchanges; and
a conversion element coupling said storage controller to said storage device for converting between SCSI command and status information exchanged used by said storage controller and non-SCSI command and for converting status information exchanges used by said non-SCSI storage device,
wherein the conversion element is adapted to generate multiple non-SCSI commands in response to receipt of a SCSI command exchange from said storage controller.

2. The subsystem of claim 1 wherein said conversion element includes:
a pass-through SCSI CDB conversion element to convert pass-through SCSI commands for application to said non-SCSI storage device.

3. The subsystem of claim 1 wherein said conversion element includes:
a read/write SCSI message conversion element to convert read and write SCSI requests for application to said non-SCSI storage device.

4. The subsystem of claim 1 wherein said conversion element includes:
a status conversion element for receiving status information from said non-SCSI storage device and converting said status information to related SCSI status information.

5. The subsystem of claim 1 wherein said non-SCSI a storage device is an IDE compliant storage device.

6. The subsystem of claim 1 wherein said storage controller is a RAID storage controller.

7. A storage controller comprising:
a SCSI-based RAID storage control core element;
an IDE interface for coupling said storage controller to a plurality of IDE disk drives;
a SCSI/IDE command conversion element for converting commands generated by said SCSI-based RAID storage controller core element for application to an IDE disk drive coupled to said IDE interface wherein said commands include one or more SCSI command descriptor blocks generated by said core element; and
an IDE/SCSI status conversion element for converting status information received from an IDE disk drive coupled to said IDE interface for application to said SCSI-based RAID storage control core element,
wherein the command conversion element is adapted to generate multiple commands for application to the IDE disk drive in response to receipt of a SCSI command from said RAID storage controller.

8. A system comprising:
a plurality of non-SCSI storage devices; and
a SCSI-based storage controller communicatively coupled to said plurality of non-SCSI storage devices wherein said SCSI-based storage controller includes:
storage management core means for managing storage of data on said plurality of non-SCSI storage devices; and
SCSI command conversion means for converting SCSI commands generated by said storage management core means for application to said plurality of non-SCSI storage devices wherein said SCSI commands include one or more SCSI command descriptor blocks generated by said SCSI-based storage controller,
wherein the conversion means further comprises:
command mapping means for mapping each SCSI command to a corresponding sequence of one or more IDE commands,
wherein the conversion means is adapted to generate multiple IDE commands in response to receipt of a SCSI command from said storage controller.

9. The system of claim 8 wherein said controller further comprises:

SCSI status conversion means for receiving status information from said plurality of non-SCSI storage devices and for converting said status information to equivalent SCSI status information and for applying said equivalent SCSI status to said storage management core means.

10. The system of claim 9 wherein said plurality of non-SCSI storage devices comprises a plurality of IDE disk drives and wherein said SCSI status conversion means comprises:

means for receiving IDE status information from said plurality of IDE disk drives; and status mapping means for mapping said IDE status information to a corresponding sequence of one or more SCSI status messages.

11. A method operable within a storage controller comprising the steps of:

generating SCSI commands to manipulate data stored on disk drive associated with said storage controller wherein said SCSI commands include one or more SCSI command descriptor blocks generated by said storage controller;

converting said SCSI commands to non-SCSI commands wherein the conversion includes converting a SCSI command into multiple non-SCSI command; and providing a mapping table wherein entries of the table maps a corresponding SCSI command to a conversion function for generating said non-SCSI commands, wherein the step of converting said SCSI commands comprises:

looking up said SCSI command in said mapping table to identify the corresponding conversion function; and invoking said corresponding conversion function to generate said non-SCSI commands.

12. The method of claim 11 further comprising the steps of:

receiving non-SCSI status information from said non-SCSI disk drives;

converting said non-SCSI status information to SCSI status information; and applying said SCSI status information to storage management elements operable within said storage controller.

* * * * *